UNITED STATES PATENT OFFICE.

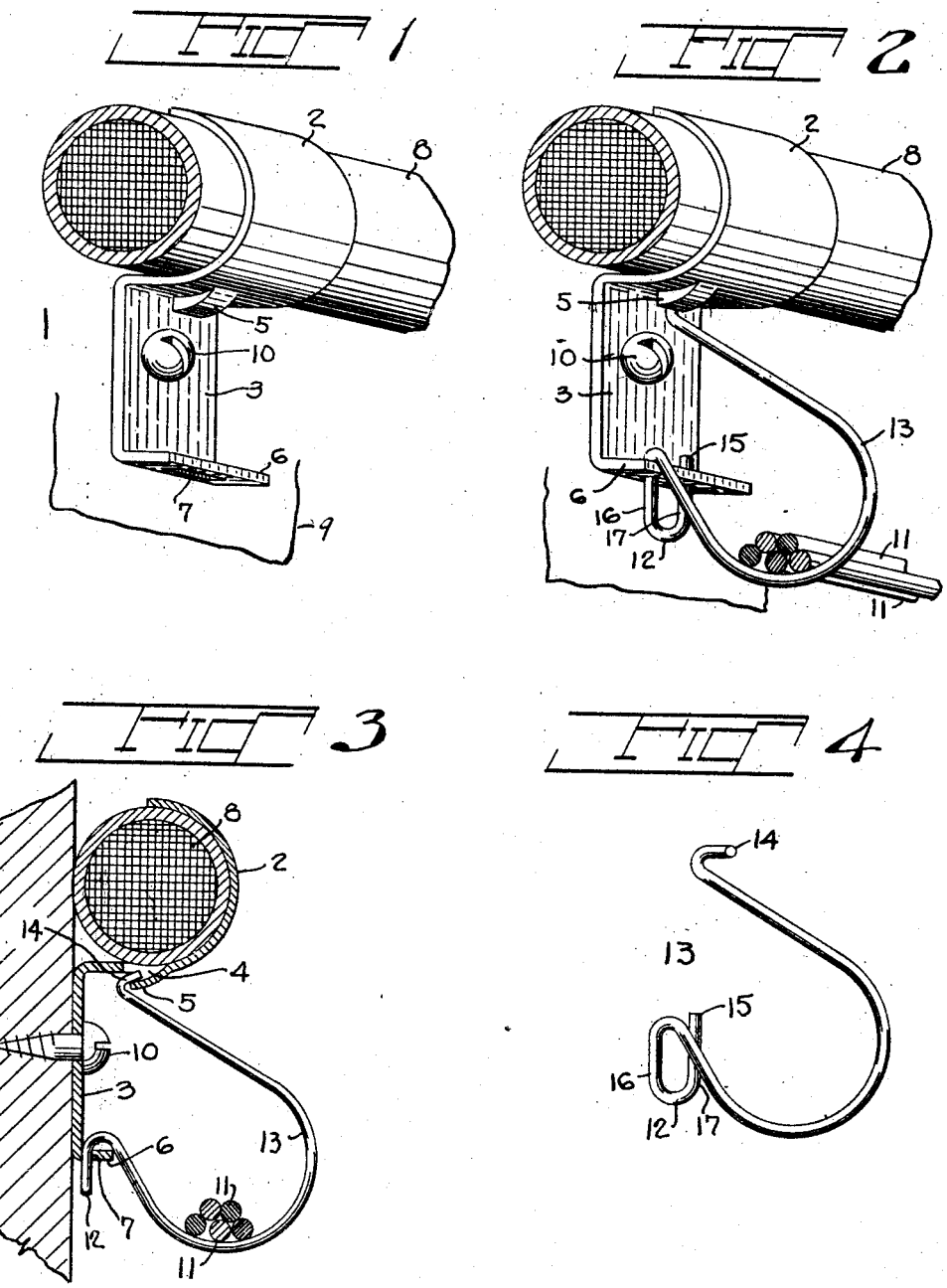

HENRY W. PLEISTER, OF WESTFIELD, NEW JERSEY, ASSIGNOR TO HENRY B. NEWHALL, OF PLAINFIELD, NEW JERSEY, EXECUTOR OF HENRY B. NEWHALL, SR., DECEASED.

CONDUIT OR CABLE CLAMP AND BRIDLE-RING.

1,365,627.    Specification of Letters Patent.    Patented Jan. 11, 1921.

Original applications filed January 23, 1920, Serial No. 353,623, and May 7, 1920, Serial No. 379,519. Divided and this application filed August 17, 1920. Serial No. 404,166.

*To all whom it may concern:*

Be it known that I, HENRY W. PLEISTER, a citizen of the United States, residing at Westfield, in the county of Union and State of New Jersey, have invented certain new and useful Improvements in Conduit or Cable Clamps and Bridle-Rings, of which the following is a specification, taken in connection with the accompanying drawings.

This application is a division of my copending applications for improvement in "conduit or cable clamp and bridle ring" filed January 23, 1920, Ser. No. 353,623, and Ser. No. 379,519 filed May 7th, 1920.

My invention relates to the combination of a conduit or cable clamp and wire bridle ring, and also to a cable or conduit clamp and a bridle ring as sub-combinations of the main combination, and as articles of manufacture.

My invention further relates to a conduit or cable clamp provided with a struck up portion on the hook to receive one end of a wire bridle ring, the base being provided with an engaging surface to coöperate with and hold the other end of the wire bridle ring.

My invention further relates to such a conduit or cable clamp provided with a struck up portion on the hook and a flange on the base; both the flange and struck up portion coöperating with and holding the two ends of a wire bridle ring.

My invention further relates to a conduit or cable clamp which is preferably formed out of sheet metal and is provided with coöperating surfaces to receive and hold the two ends of a wire bridle ring. My invention further relates to wire bridle rings which are used with my improved conduit and cable clamps.

While my conduit or cable clamp is preferably formed out of pressed sheet material as pressed steel, it may be formed from castings of malleable iron, brass, an alloy, aluminum or any other metal, or it may be made out of pressed fibrous material.

My invention further relates to certain combinations, sub-combinations, articles of manufacture, and details of construction, all of which will be more fully hereinafter described and pointed out in the claims.

In the figures, in which I have shown one embodiment of my invention, the same reference numerals refer to similar parts in the several figures.

Figure 1 is a perspective view of my conduit and cable clamp and of a cable which it supports.

Fig. 2 is a perspective view of the conduit and cable clamp shown in Fig. 1 with the addition of a wire bridle ring.

Fig. 3 is a vertical section through the conduit and cable clamp shown in Fig. 2.

Fig. 4 is a perspective view of one form of wire bridle ring which I preferably employ.

In the commercial use of conduit or cable clamps it is not generally possible, at the date of the original installation, to determine whether or not bridle rings will be needed to support additional loose strands of bridle wires. In commercial practice, a cable is supported on a wall or other suitable support and it may be weeks, months, or years later that the telephone engineers will determine that it is desirable to support bridle wires parallel to the cable.

By my invention my original conduit or cable clamp may be used as a separate article of manufacture or sub-combination, and then later, when the needs of the service demands it, my bridle ring may be supported by the same conduit or cable clamp, when the complete combination would be used.

In my invention I form my conduit or cable clamp 1 with a hook portion 2 and a base 3. Preferably, though not necessarily, this conduit clamp is formed of pressed sheet metal.

On the hook portion 2, I form a pocket or recess 4 in any suitable manner to receive one end of a bridle ring. When the conduit or cable clamp 1 is formed from pressed sheet metal, which is the preferred construction, I strike up a portion or lip 5 from the hook 2 to make this pocket 4.

The base 3 is provided with any suitable means to secure one end of the wire bridle ring. I have shown by way of example the base provided with a flange 6 which is provided with a slot 7.

The cable 8 is secured to the wall or other suitable support 9 by means of the conduit or cable clamp and screw 10.

Whenever it becomes necessary to increase the capacity of the installation by stringing bridle wires 11, 11 this can be easily done by hooking the hook 12 of the bridle ring 13 through the slot 7 in the flange 6 springing its other hook 14 under the lip 5 and into the pocket or recess 4 on the hook 2, Figs. 2 and 3.

The bridle ring 13 is formed from wire one end being bent back on itself to form the hook 14. The other end 15 is bent to form a U-shaped hook 12 having the arms 16 and 17. These arms are spaced apart so that to seat the hook 12 within the slot 7 requires slight pressure which causes the two arms 16 and 17 to approach each other slightly. This insures that there will be no rattling of the round wire bridle ring in the elongated slot 7. This also insures that there will be no accidental disengagement of the hook 12 from the slot 7. This slot, without any change, will also coöperate with a bridle ring formed from flat sheet metal.

The bridle wires 11, 11 cannot become detached from the conduit or cable clamp 1 in the wire bridle ring 13 for they are completely surrounded.

The hook 14 preferably does not touch the cable 8 so that the cable will not be cut, scratched or marred by the bridle ring.

Should it ever be desirable to remove the bridle wires 11, 11 this can be easily done by compressing the wire bridle ring 13 so as to release the hook 14 from the pocket or recess 4 which will then permit the hook 12 to be lifted out of the slot 7 in the flange 6.

Having thus described this invention in connection with an illustrative embodiment thereof, to the details of which I do not desire to be limited, what is claimed as new and what is desired to secure by Letters Patent is set forth in the appended claims.

What I claim is:—

1. The combination of a conduit or cable clamp having a hook portion and a base, the hook portion being provided with a struck up part to receive one end of a wire bridle ring, means carried by the base to receive the other end of the wire bridle ring, and a wire bridle ring having a U-shaped hook member on one end and a hook on the other end, the U-shaped member engaging said means, and the hook engaging the said struck up portion of the clamp.

2. The combination of a conduit or cable clamp formed out of sheet material having a hook portion, a base provided with a flange having a recess to receive one end of a bridle ring, the hook portion being provided with a struck up part to receive the other end of the bridle ring, and a wire bridle ring having one of its ends held in the recess in the flange and its other end held by the struck up part of the hook portion.

3. A new article of manufacture comprising a bridle ring formed out of wire having a hook at either end adapted to hook into a conduit or cable clamp to form a closed bridle ring, the hook at one end being formed by bending the end of the wire to form a flat U-shaped hook, the closed portion of the U-shaped hook being at the bottom of the hook to permit it to be readily pressed into a socket on a conduit or cable clamp.

HENRY W. PLEISTER.

Witnesses:
 MARY R. RYAN,
 ELIZABETH J. RATH.